United States Patent [19]

Sheehan et al.

[11] Patent Number: 5,239,015

[45] Date of Patent: Aug. 24, 1993

[54] PROCESS FOR MAKING LOW OPTICAL DENSITY POLYMERS AND COPOLYMERS FOR PHOTORESISTS AND OPTICAL APPLICATIONS

[75] Inventors: Michael T. Sheehan; James H. Rea, both of Corpus Christi, Tex.

[73] Assignee: Hoechst Celanese Corporation, Somerville, N.J.

[21] Appl. No.: 706,601

[22] Filed: May 28, 1991

Related U.S. Application Data

[63] Continuation-in-part of Ser. No. 608,847, Oct. 26, 1990, abandoned, which is a continuation-in-part of Ser. No. 548,344, Jun. 29, 1990, abandoned.

[51] Int. Cl.$^5$ .................... C08F 8/14
[52] U.S. Cl. .................. 525/344; 525/333.3; 525/333.5; 525/333.6; 525/346; 525/374
[58] Field of Search ............ 526/75; 528/371; 525/333.3, 333.5, 333.6, 344, 346, 374

[56] References Cited

U.S. PATENT DOCUMENTS

| | | | |
|---|---|---|---|
| 4,689,379 | 8/1987 | Chuang | 526/282 |
| 4,822,862 | 4/1989 | Rupp et al. | 525/367 |
| 4,857,601 | 8/1989 | Gupta | 525/353 |
| 4,898,916 | 2/1990 | Gupta | 525/344 |
| 4,912,173 | 3/1990 | Keene et al. | 525/378 |

FOREIGN PATENT DOCUMENTS 0260104 3/1988 European Pat. Off.
0343986 11/1989 European Pat. Off.

Primary Examiner—Joseph L. Schofer
Assistant Examiner—Jeffrey T. Smith
Attorney, Agent, or Firm—James J. Mullen; Donald R. Cassady

[57] ABSTRACT

The present invention pertains to a process for the preparation of polymers comprising poly(4-hydroxystyrene) or substituted poly(4-hydroxystyrene) or both. The polymers have low optical density (absorbance) over a wavelength range from about 240 to about 260 nm, as well as low optical density over the near UV and visible spectrum (310 to 800 nm). Such polymers are produced by polymerizing 4-acetoxystyrene and/or substituted 4-acetoxystyrene monomers, with or without other comonomers, and subsequently performing transesterification. In the most preferred embodiment of the present invention, the polymers are produced using at least one alcohol as a reaction medium, a chain transfer agent and a transesterification reactant, providing an unusually economic process. These polymers are particularly useful as photoresist components for use in combination with deep UV, X-ray, and E-Beam imaging systems.

To obtain polymers having low optical density over the 240 to 260 nm radiation wavelength range, it is necessary to use an initiator which does not comprise a substantially absorbant structure over the 240 to 260 nm range or to use an initiator concentration of less than about 3 mole % of the monomer(s), to obtain a polymerization conversion of the initial polymerization monomers of at least about 90% by weight, or to remove residual monomer(s) from the reaction medium prior to transesterification, and to obtain a transesterification conversion of the polymerized monomers of at least 85% by weight. It is also necessary to avoid the use of transesterification catalyst which can cause the formation of chemical structures which can absorb over the 240 to 260 nm radiation wavelength range.

53 Claims, No Drawings

PROCESS FOR MAKING LOW OPTICAL DENSITY POLYMERS AND COPOLYMERS FOR PHOTORESISTS AND OPTICAL APPLICATIONS

This application is a continuation-in-part patent application of pending U.S. patent application Ser. No. 07/608,847, filed Oct. 26, 1990, now abandoned which is a continuation-in-part patent application of U.S. patent application Ser. No. 07/548,344, filed Jun. 29, 1990, since abandoned.

BACKGROUND OF THE INVENTION

1. Field of the Invention

The present invention pertains to a process for making and to compounds comprising homopolymers, copolymers, and terpolymers (hereinafter referred to as "polymers") of 4-hydroxystyrene and/or substituted 4-hydroxystyrene. The polymers have low optical density (absorbance) over a wavelength range from about 240 to 260 nm, as well as low optical density over the visible and near UV spectrum (310 to 800 nm). Such polymers can be produced using a single compound which serves as a reaction medium for the polymerization, as a chain transfer agent and as a transesterification reactant, providing an unusually economical process. The polymers of the present invention are particularly useful (directly or in modified form) as photoresist materials for deep UV, X-ray, and E-Beam imaging systems.

2. Description of the Background Art

There are numerous applications within the semiconductor industry which require photoresists materials having low absorbance in the deep U.V. (240 to 260 nm) wavelength region. The novolak photoresist polymers which have been used for optical lithography are limited to wavelengths longer than 300 nm because of the high absorbance of the novolak material at shorter wavelengths. It has recently been learned that polymers and copolymers of 4-hydroxystyrene and substituted 4-hydroxystyrenes are particularly useful over a wavelength range from about 240 to 260 nm. The molar absorbtivity ($\epsilon$) of such polymers and copolymers over this wavelength range is as low as about 50 1 cm$^{-1}$ mole$^{-1}$.

There is a need for an economic method or process for producing polymers and copolymers of 4-hydroxystyrene and substituted 4-hydroxystyrene.

U.S. Pat. No. 4,822,862, issued Apr. 18, 1989, to R. W. Rupp et al., describes the homopolymerization and copolymerization of 4-acetoxystyrene monomer (4-ASM) in an aqueous emulsion and, without isolation, the hydrolysis of the polymers and copolymers of 4-ASM to homopolymers and copolymers of 4-hydroxystyrene using a base.

U.S. Pat. No. 4,912,173, issued Mar. 27, 1990, to D. L. Keene et al., discloses a process for hydrolyzing homopolymers of 4-ASM to homopolymers of 4-hydroxystyrene. The hydrolysis is carried out in an aqueous suspension in the presence of a nitrogen-comprising base.

European Patent No. 343,986, issued Nov. 29, 1989, to R. Vicari et al., describes the preparation of polymers of 4-ASM or polymers of 4-hydroxystyrene by suspension polymerization. The suspension polymerization comprises forming an aqueous suspension of 4-ASM in the presence of polyacrylic acid and at least 2 free radical catalysts, one of which has a half life of 1 hour below 100° C. and the other which has a half life of 1 hour above 100° C.

The suspension is heated to 70°-95° C. to achieve about 50 wt % polymerization, and then polymerization is completed by heating above 95° C. To form the polymer of 4-hydroxystyrene (4-HSM), the reaction temperature is then reduced to between 30°-95° C. and the suspension is reacted with ammonium hydroxide in an amount of at least 2 moles of ammonia for each equivalent of 4-ASM.

The poly(4-hydroxystyrene) produced by the above-described method, typically has an absorbance at 248 nm which ranges from about 300 to 350 liters/cm$^{-1}$ mole$^{-1}$ (molar absorbtivity, $\epsilon$).

U.S. Pat. No. 4,898,916, issued Feb. 6, 1990, to B. Gupta et al. describes a process for the conversion of poly(4-acetoxystyrene) (4-PAS) to poly(4-hydroxystyrene) (4-PHS). The process comprises: a) forming an alcoholic slurry of (4-PAS); b) adding an acid to the slurry; and c) maintaining slurry temperature at 20°-65° C. until the polymer dissolves in the alcohol, indicating complete acetoxy to phenolic group conversion.

Processes wherein the 4-ASM is polymerized into a homopolymer or a copolymer with another copolymerisable monomer, and especially wherein the comonomer is styrene, are claimed. The 4-PHS or copolymers of 4-HSM is expected to have a molar absorptivity, $\epsilon$, ranging from about 300 to 1,000 depending on the 4-PAS used as the precursor for the reaction described.

U.S. Pat. No. 4,689,379, issued Aug. 25, 1987, to J.D. Elmore et al., discloses the hydrolysis of polymers of 4-ASM by methanolsis with quaternary ammonium hydroxides to 4-PHS.

European Patent Application No. 87307912.3, published Mar. 16, 1988, discloses a process for preparing polymers comprising 4-PHS by initially reacting 4-ASM and methanol, with subsequent reaction of 4-ASM, methanol, 4-HSM, polymers of 4-ASM, and polymers of 4-HSM, in the presence of an ammonium base using a free radical initiator. The initiator is selected from a group of initiators including benzoyl peroxide, lauroyl peroxide, acetyl peroxide, cumene hydroperoxide, paramethane hydroperoxide, etc.

G. Pawlowski et al. disclosed the polymerization of 3-methyl-4-acetoxystyrene using 2,2'-azobis(2-methylpropanenitrile) in tetrahydrofuran (THF) to produce poly(3-methyl-4-acetoxystyrene) at the March 1990 SPIE meeting held at San Jose, Calif.

The poly(3-methyl-4-acetoxystyrene) polymerized by G. Pawlowski et al. in THF was isolated (precipitated) and dried prior to subsequent use. This dried poly(3-methyl-4-acetoxystyrene) can then be slurried in methanol and processed as described above by B. Gupta et al. to provide homopolymers and copolymers of poly(3-methyl-4hydroxystyrene).

However, preparation of 4-HSM polymers using a combination of the above techniques would be very expensive. The THF solvent used by Powlowski et al. in polymerizing the 4-PAS is toxic. In addition, the precipitation and drying of the 4-PAS adds additional cost in the form of unit operations and waste disposal. In addition, the method of Gupta et al. disclosed in U.S. Pat. No. 4,898,916 is difficult ot accomplish on a large scale due to problems encountered in a making of a slurry of the 4-PAS in alcohol. The 4-PAS tends to "clump" or remain in agglomerated form in the alcohol, due to insolubility.

SUMMARY OF THE INVENTION

In accordance with the present invention, it has been discovered that despite the partial insolubility of poly(4-acetoxystyrene) (4-PAS) in alcohols, it is possible to polymerize homopolymers, copolymers, and terpolymers (hereinafter referred to as "polymers") comprising poly(4-acetoxystyrene) and/or substituted poly(4-acetoxystyrene) (S-4-PAS) in an alcohol reaction medium, and to subsequently transesterify the polymer comprising 4-PAS and/or S-4-PSA, preferably in the same alcohol reaction medium, to produce a polymer comprising poly(4-hydroxystyrene (4-PHS) and/or substituted poly(4-hydroxystyrene) (S-4-PHS). The initial polymerization of 4-acetoxystyrene monomer (4-ASM) and/or substituted 4-acetoxystyrene monomer (S-4-ASM) to produce a polymer comprising 4-PAS and/or S-4-PAS is carried out in a manner which permits formation of a transesterification reaction mixture comprising no more than 10% by weight of residual monomer(s) (based on the polymer porduced). This 10% by weight residual monomer can be achieved by obtaining 90% conversion of the combination of all monomers initially present during the polymerization reaction, or by removing such monomers from the reaction mixture after the polymerization is completed but prior to the transesterification reaction. The initial concentration of monomer in the monomer/reaction medium mixture is preferably greater than 40% by weight. The transesterification of 4-PAS and/or S-4-PAS is carried out so that at least 85% of the 4-PAS and/or S-4-PAS is converted to 4-PHS and/or S-4-PHS.

As described above, it would be possible to produce polymers comprising the 4-PAS and/or S-4-PAS by polymerizing the starting monomers to less than 90% conversion, so long as residual monomer is removed from the polymerization reaction mixture prior to the transesterification reaction. It has been discovered that, in the production of homopolymers and copolymers of 4-PAS and/or S-4-PAS, as the polymerization of monomers progresses and the polymer formed therefrom increases in molecular weight, the polymer becomes insoluble in an alcohol polymerization medium. It is then possible to discontinue agitation of the reaction mixture, permitting the swollen polymer to separate, to decant the alcohol reaction medium containing the residual monomer, to replace the decanted alcohol with fresh, clean alcohol, and to proceed with the transesterification. This removal of the 4-PAS and/or S-4-PAS alcohol polymerization medium (and replacement with fresh clean alcohol) accomplishes the removal of excess initiator, initiator fragments, unreacted monomer and oligomers, all of which can be sources for harmful, optical-density-increasing contamination of the 4-PHS and/or S-4-PHS product.

The above description is in terms of the use of an alcohol solvent as the polymerization reaction medium, since this is the most preferred embodiment of the present invention. However, other solvents can be used in the method of the present invention, so long as there is sufficient alcohol present during the transesterification step for transesterification to take place.

Preferred "other solvents" are polar solvents which do not contain acetate groups. In a less preferred embodiment of the present invention, these polar solvents can be used as the sole solvent during polymerization of the polymer comprising 4-acetoxystyrene and/or substituted 4-acetoxystyrene; however, an alcohol must then be added prior to the transesterification to a polymer comprising 4-hydroxystyrene and/or substituted 4-hydroxystyrene. In a more preferred embodiment of the present invention, the polar solvent would be used as a co-solvent with an alcohol throughout the process of the present invention. Examples of suitable polar solvents include tetrahydrofuran, methylethyl ketone, acetone, and 1,4-dioxane.

Nonpolar solvents can be used as co-solvents in combination with an alcohol, provided the concentration of the nonpolar solvent is sufficiently low. Typically, the nonpolar solvent is present at a concentration of less than 25% by weight. Examples of suitable nonpolar solvents include heptane, hexane, and cyclohexane.

Other comonomers can be copolymerized in combination with the 4-ASM and/or S-4-ASM so long as the other comonomers do not absorb at radiation wavelengths ranging from about 240 to about 260 nm.

"Substituted", as referred to above is intended to means that the ring structure of the molecule has substituent groups thereon, wherein the substituent groups are methyl or ethyl. Preferred substituent groups are methyl and the preferred substituted positions are the 3, 5, or 3 and 5 positions.

It is possible to obtain polymers comprising 4-PHS and/or S-4-PHS having a molar absorbtivity, $\epsilon$, ranging from about 40 to about 250 (at a wavelength of 248 nm) using the method described above. To obtain a polymer comprising 4-PHS and/or a S-4-PHS having this molar absorbtivity at 248 nm, it is necessary to:

1)
   a. Use a polymerization initiator which does not comprise an absorbant structure; absorbant structures such as aromatic rings increase molar absorbtivity, $\epsilon_{248}$, typically by a factor of 2 when the weight average molecular weight of the polymer comprising 4-PHS or S-4-PHS ranges from about 5,000 to about 25,000 (as determined by gel permeation chromatography (GPC vs. polystyrene standards), or
   b. Use a polymerization initiator which does comprise an absorbant structure but limit the initiator concentration to less than about 3 mole % of the monomer used to produce the polymer.
2) Obtain a polymerization conversion of the monomer(s) of at least 90% by weight; or remove residual monomer(s) from the reaction medium so that residual monomer in the subsequent transesterification reaction mixture comprises no more than 10% by weight of the polymer comprising 4-PAS and/or S-4-PAS polymer;
3) Obtain a transesterification conversion of at least 85% by weight;
4) Use acid catalysts in the alcoholysis transesterification of of the polymer comprising 4-PAS or S-4-PAS to the polymer comprising 4-PAS or S-4-PHS, respectively; use of basic catalysts can cause the formation of quinones and other chemical structures which absorb over the 240–260 nm wavelength range, and can also absorb over the near UV and visible wavelengths from about 310–800 nm. 4-PHS prepared using basic catalysts is typically opaque and brown in color.

It is also advisable to avoid monomer storage inhibitors which substantially absorb over the deep UV wavelengths.

The composition of the polymers made by the process described above has empirically been determined to meet specific requirements which result in the desired low optical density (absorbtivity of 250 or less) over the 240 to 260 nm wavelength. In particular, the polymer comprising 4-PHS (and/or S-4-PHS) contains less than about 2.5% by weight of residual 4-hydroxystyrene monomer (or derivative residues thereof). When the polymer contains as much as 2.5% by weight of such residual 4-hydroxystyrene monomer, then the amount of poly 4-acetoxystyrene which remains in the polymer (due to less than 100% transesterification) must be less than about 2.5% by weight of the polymer. When the polymer contains less than 2.5% by weight of the residual 4-hydroxystyrene monomer (or derivative residues thereof), the amount of poly 4-acetoxystyrene which remains in the polymer can be larger. For example, when residual 4-hydroxystyrene monomer is less than about 0.7% by weight of the polymer, the poly(4-acetoxystyrene) content must be less than about 13% by weight of the polymer.

For purposes of clear expression of the concept of the present invention, the language is simplified in portions of the following text by describing the invention in terms of the preparation of polymers comprising poly(4-hydroxystyrene). However, it is intended that polymers comprising substituted poly(4-hydroxystyrene) be included as well. When it is necessary to make a distinction, or when the language does not become too cumbersome, substituted 4-acetoxystyrene monomers are discussed specifically.

The "single pot", simplified process of the present invention, can be used for the preparation of polymers comprising of poly(4-hydroxystyrene) and comprises the following steps:
a) reacting a mixture comprising 4-acetoxystyrene (monomer) and an initiator, which itself, its decomposition products, and capped structures which it produces, do not substantially absorb over the wavelengths ranging between about 240-260 nm; or, using no more than about 3 mole % of an absorbing initiator per mole of monomer, in an organic solvent reaction medium, to produce a polymer comprising 4-acetoxystyrene; wherein, either as a result of monomer conversion or due to removal of residual monomer after polymerization, residual monomer in the subsequent transesterification reaction medium comprises no more than 10% by weight of the polymer comprising 4-acetoxystyrene which is produced; and
b) subsequently transesterifying the polymer comprising 4-acetoxystyrene to a polymer comprising 4-hydroxystyrene in a transesterification reaction medium comprising at least one equivalent of alcohol per equivalent of nontransesterified poly(4-acetoxystyrene), using an acid catalyst, wherein at least 85% conversion of the poly(4-acetoxystyrene) to poly(4-hydroxystyrene) is achieved.

In the most preferred embodiment of the above-described invention, at least the majority of the organic solvent reaction medium of step a) is a $C_1$-$C_5$ (straight or branched) alcohol. In addition, the step b) transesterification reaction medium is essentially the same reaction medium as that used in step a) or is a functional equivalent thereof.

When monomer(s) other than 4-ASM and/or S-4-ASM are used in combination with these monomers in the above-described process, the other monomer must have at least one vinyl group present and must not substantially absorb radiation over wavelengths ranging from about 240 to about 260 nm.

The simplified process of the present invention can be used for the preparation of copolymers of 4-hydroxystyrene with substituted 4-hydroxystyrene, wherein the preferred substituted 4-hydroxystyrene monomer is selected from the group consisting of 4-hydroxystyrene substituted in the 3, 5, or 3 and 5 positions with methyl or ethyl substituents. The process steps for producing a copolymer of 4-PHS with S-4-PHS comprise:
a) reacting a mixture comprising 4-acetoxystyrene monomer, substituted 4-acetoxystyrene monomer and an initiator, wherein said initiator and its decomposition products alone, and capped structures which it produces, do not substantially absorb radiation over wavelengths ranging from about 240 to about 260 nm; or, using no more than about 3 mole % of an absorbing initiator per mole of monomer, in an organic solvent reaction medium to produce a copolymer of poly(4-acetoxystyrene) with substituted poly(4-acetoxystyrene), in a manner such that residual monomers present in the reaction medium during subsequent transesterification reaction step(s) comprises no more than 10% by weight of the copolymer formed during the reaction; and
b) subsequently transesterifying the copolymer of poly(4-acetoxystyrene) and substituted poly(4-hydroxystyrene) to copolymers of poly(4-hydroxystyrene) and substituted poly(4-hydroxystyrene), in a transesterification reaction medium comprising at least one equivalent of alcohol per equivalent of non-transesterified copolymer, using an acid catalyst to achieve transesterification of at least 85% of the poly(4-acetoxystyrene) and poly(4-hydroxystyrene).

In the most preferred embodiment of the above-described invention, at least the majority of the organic solvent reaction medium of step a) is a $C_1$-$C_5$ (straight or branched) alcohol. In addition, the step b) transesterification reaction medium is essentially the same reaction medium as that used in step a) or is a functional equivalent thereof.

The following description applies to the embodiments of the invention for which the process steps are disclosed above.

The initiator used in step a) must not comprise a structure which decomposes to an initiating free radical which alone or as a polymer capping group substantially absorbs in the 240-260 nm wavelength range, when the quantity of such initiator is more than about 3 mole % of the monomer. Such absorbing free radical initiators, which should be avoided at concentrations above that described above, include those having aromatic components, for example benzoyl peroxide, t-butylperoxybenzoate, and di-t-butyl di-peroxyphthalate. Examples of useful initiators which do not substantially absorb over the 240-260 nm wavelength range include, but are not limited to, 2,2'-azobis(2,4-dimethylpentanenitrile), 2,2'-azobis(2-methylpropanenitrile), 2,2'-azobis(2-methylbutanenitrile, 1,1'-azobis(cyclohexanecarbonitrile), t-butyl peroxypivalate, t-amyl peroxypivalate, t-butyl peroxy-2-ethylhexanoate, diisononanoyl peroxide, decanoyl peroxide, succinic acid peroxide, di(n-propyl) peroxydicarbonate, di(secbutyl) peroxydicarbonate, di(2-ethyl-hexyl) peroxydicarbonate, t-butylperoxyneodecanoate, 2,5-dimethyl-2,5-di(2 ethylhexanoylperoxy)hexane, t-amylperoxyneodecanoate, t-butylperoxy-neodeconate, and combinations thereof. The most preferred initiators include 2,2'-azobis(2-methylpropanenitrile), 2,2'-azobis(2,4-dimethylpentanenitrile, and t-butylperoxipivalate.

The useful initiator for step a) of the present invention should have a half life ranging from about 0.5 to about 10 hours at the temperature at which the reaction is carried out. Typically the reaction temperature is the reflux temperature of the alcohol reaction medium. However, it is not necessary that the reaction temperature be the alcohol reaction medium reflux temperature. Reaction vessel pressure can be used to adjust the reaction temperature. A preferred initiator half life ranges from about 0.75 to about 5 hours at the reaction temperature, with a most preferred initiator having a half life ranging from about 1 to about 2 hours.

An alcohol used in step a) as the reaction medium can be any of the known alcohols which dissolve the monomer(s), preferably $C_1$ to $C_5$ alcohols in view of reaction rate considerations of step b), with $C_1$ to $C_3$ and n-alcohols being more preferred. The most preferred alcohols are methanol and ethanol, which function well in the step b) transesterification reaction. Methanol reacts faster than ethanol in the transesterification reaction. Mixtures of alcohols with other alcohols or with other organic solvents can be used as the step a) and step b) reaction medium. Methanol or ethanol can be added to or used as the reaction medium in step b) to achieve transesterification.

It is an added benefit when the solvent used in step a) can function as a chain transfer agent, whereby the molecular weight of the polymer can be controlled. The alcohols described above and in particular solvents such as THF appear to function well as chain transfer agents.

To achieve at least 90% conversion of the monomer(s) in the polymerization reaction of step a) periodic or continuous addition of initiator during the reaction is required. Failure to convert the 4-ASM to 4-PAS (or S-4-ASM to S-4-PAS) permits the formation of 4-hydroxystyrene (4-HSM) during step b). The 4-HSM or S-4-HSM can form quinones which highly absorb in the 240–260 nm wavelength range. When a monomer(s) conversion of at least 90% is not achieved, excess monomer must be removed prior to the transesterification step. Such excess monomer can be removed using a decantation step or other means so that residual monomer present is no more than 10% by weight of the polymer produced.

The transesterification step b) is most preferably carried out in the alcohol reaction medium of step a). However, at least one transesterifying alcohol must be present in step b) or substituted for the reaction medium of step a) after decantation. The preferred transesterifying alcohols include methanol and ethanol when this reaction is carried out at the reflux temperature of the reaction medium organic solvent at atmospheric pressure (or at the reflux temperature above atmospheric pressure). Other alcohols up to about $C_4$ alcohols can be used to provide an acceptable transesterification reaction rate, at temperature above their atmospheric pressure reflux temperature.

It is important that the transesterification of 4-PAS to 4-PHS (also S-4-PAS to S-4-PHS, etc.) in step b) be at least 85% by weight, preferably 95% by weight, and most preferably 98% by weight, since residual PAS absorbs in the 240–260 nm wavelength range.

Typically steps a) and b) of the present invention will be followed by a step c) in which the polymer comprising 4-PHS and/or S-4-PHS which is produced in step b) is precipitated from the organic solvent reaction medium using water. Other non-solvent for the polymer such as hexane can be used in place of water for the precipitation. It is important that the precipitation be accomplished by adding the polymer/reaction medium mixture to water (or other non-solvent) which is in motion. Typically, at room temperature, the weight amount of water should be in excess of the weight amount of polymer/reaction medium mixture by at least a factor of eight. Addition of water to the polymer/reaction medium mixture causes formation of an agglomeration of polymer containing residual alcohol and alcohol acetate rather than the formation of discreet particles.

The amount of polymer which comprises 4-PHS and/or S-4-PHS in the final, transesterification reaction mixture typically ranges between about 10 wt % to about 30 wt %. The preferred weight % polymer range is between about 15% and about 25%, since the particle size of the precipitated homopolymer or copolymer is typically larger than about 25 microns when a concentration of polymer of less than about 30% by weight is present in the final reaction mixture.

Residual acid catalyst from step b) can be removed by: 1) adding a base to the reaction medium at the completion of the transesterification step b); 2) processing the polymer/reaction medium after completion of step b) through an ion exchange resin, wherein the ion exchange resin contains a chemically bound base; 3) adding a base to the water used in the precipitation step c); 4) water washing the precipated polymer from step c) using a neutral pH water, or; 5) water washing the precipitated polymer from step c) using a base-containing water, preferably having a pH ranging from about 7.5 to about 10.

The method or process of the present invention is particularly economical when an alcohol functions as the reaction medium in steps a) and b), since the alcohol can function as the chain transfer agent during polymerization of the 4-ASM and as the transesterification reactant used to form 4-PHS. The initial alcohol acetate formed during the transesterification reaction also aids in the dissolution of the 4-PAS, which helps to speed up the transesterification reaction.

DETAILED DESCRIPTION OF THE INVENTION

The process of the present invention is shown in the rection sequence structures depicted below for the production of homopolymers of PHS produced in an alcohol reaction medium:

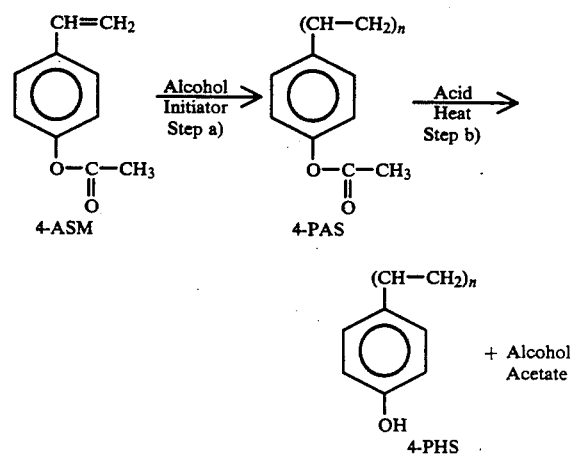

Homopolymers of S-4-PHS, wherein the substituent groups are methyl or ethyl, or copolymers of 4-PHS and S-4-PHS can be produced in the same manner.

When other monomers are used in combination with 4-ASM or S-4-ASM to produce copolymers or terpolymers of 4-PHS or S-4-PHS, such monomers are added to step a). Such monomers include compounds having at least one vinyl group present, which compounds do not substantially absorb in the 240–260 nm wavelength range. Examples of monomers which do not substantially absorb include, but are not limited to:

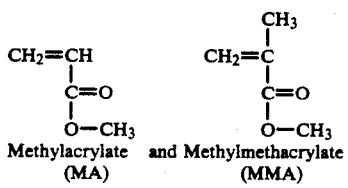

Methylacrylate (MA) and Methylmethacrylate (MMA)

When copolymers of 4-PHS with S-4-PHS are prepared by the method of the present invention, the preferred substituent groups on the S-4-PHS molecule are methyl and ethyl. The preferred substituent positions on the 4-hydroxystyrene molecule are the 3,5, or 3 and 5 positions.

The most preferred method of the present invention, wherein homopolymers of 4-PHS and S-4-PHS were produced, is described in EXAMPLES 1 to 57 which follow. EXAMPLES 58–60 pertain to the method of the invention wherein the reaction medium comprises a mixture of organic solvents. The method of the present invention wherein a copolymer of 4-PHS and methyl methacrylate was produced is described in EXAMPLE 61. EXAMPLE 62 is a comparative example in view of published related art.

EXAMPLES 1 to 62 were carried out as batch reactions in reactor vessels ranging from about 500 ml to 2,000 ml in volume. Each reaction vessel was a 4-neck flask outfitted with a chilled water reflux condenser, nitrogen purge line (used to exclude oxygen from the reaction vessel), overhead stirrer/mixer, and a temperature indicator (thermocouple).

A premix of an alcohol, an alternative organic solvent, or an alcohol/co-organic solvent reaction medium, the 4-ASM, or S-4-ASM, or 4-ASM and methyl methacrylate and the initiator was prepared in a beaker and the premix was placed in the reaction vessel. The initial concentration of 4-ASM (or other monomer(s)) in the reaction medium-monomer mixture typically ranged from about 10% by weight to about 50% by weight. Preferably the relative amount of 4-ASM (or other monomer(s)) to reaction medium was greater than 30% by weight and most preferably greater than 40% by weight. Conversion of 4-ASM to 4-PAS appears to be reduced when the relative amount of 4-ASM to reaction medium is reduced.

The mixer was started (typically mixing speed was about 100 to 400 rpm). The premix was then nitrogen purged at room temperature for a time period of about 5 to 10 minutes.

After the 5 to 10 minute time period, the temperature of the premix was increased to the reflux temperature of the reaction medium using an electrically heated jacket on the exterior of the flask reaction vessel.

The 4-ASM (or other monomer(s)) was permitted to polymerize for a time period equal to about one half life of the initiator at the reflux temperature (at atmospheric pressure). The "half life" as used herein is the time required for one half by weight of the initiator to thermally decompose to produce free radicals (typically two free radicals per initiator molecule).

At the time about one half by weight of the initiator had decomposed, additional initiator (dissolved in a solvent such as the same alcohol as that typically used as at least a portion of the reaction medium), was added to the reaction vessel. The amount of additional initiator added ranged from about 10% to about 90% of the amount of initiator in the premix.

The above procedure for adding initiator to progressing polymerization was repeated as necessary to achieve at least 90% conversion of 4-ASM to 4-PAS. Typically 4 to 8 additions of initiator were made during the polymerization. One skilled in the art can use a continuous addition of initiator during polymerization to accomplish the at least 90% conversion described above.

Applicants carried out a batch polymerization wherein there was no initiator in the premix, but initiator was added continuously to the premix during the polymerization. The initiator was dissolved in the alcohol used for the reaction medium. The amount of initiator was based on the amount of initiator required for previous polymerizations but was reduced by about 30% in view of anticipated continuous free radical availability. See Example 25 of TABLE 1.

The time period for the polymerization of 4-ASM to 4-PAS was that sufficient to achieve at least 90% by weight conversion of the 4-ASM to 4-PAS. Conversion was typically determined by capillary gas/liquid chromatography of the reaction mixture. Typically reaction times ranged from about 4 hours to about 9 hours.

The weight average molecular weight of 4-PAS produced by the above-described method ranged from about 6,500 to about 27,000.

The transesterification reaction was typically carried out in the polymerization reaction medium. However, whereas the polymerization of 4-ASM to 4-PAS can be carried out in a non-alcohol-comprising reaction medium, the transesterification reaction requires the presence of an alcohol. The amount of alcohol which must be present at any time during the transesterification reaction is at least about one equivalent based on the amount of unreacted (nontransesterified) 4-acetoxystyrene. Typically, at least about ten equivalents of alcohol based on unreacted 4-acetoxystyrene are used, since the transesterification rate is improved by an increase in the number of equivalents of alcohol.

An example wherein the polymerization reaction medium (alcohol) was decanted and replaced with clean alcohol prior to the transesterification is marked with a # in the tables containing the Examples. The replacement alcohol in this example was the same alcohol as that used during the polymerization.

Reflux temperature of the reaction medium was typically maintained during the transesterification reaction (at atmospheric pressure). Transesterification was carried out using an acid catalyst, to cause the alcohol present in the reaction medium to react with the 4-PAS, converting the 4-PAS to 4-PHS. The acid catalyst concentration typically ranged from about 100 to about 400 ppm based on the total weight of the reaction mixture. However, acid catalyst concentrations ranging from about 5 ppm to about 10,000 ppm can be used, with catalyst concentration preferably ranging from about 50 ppm to about 2,000 ppm, and most preferably from about 100 ppm to about 500 ppm. The acid was typically dissolved in the same alcohol as that used for at least a portion of the reaction medium, to produce an alcohol solution containing an acid catalyst concentration ranging from about 0.5% by weight to 2.0% by weight acid based on the total acid catalyst solution. The acid catalyst solution was added to the reaction vessel in a single addition. However, acid catalyst can be added during the reaction, if desired.

Acids which were used as acid catalyst included hydrochloric acid, phosphoric acid, nitric acid, sulfuric acid, methane sulfonic acid, and toluene sulfonic acid. The particular acid used is not critical to the invention. Preferred acids were those which did not substantially react with the 4-PAS or the 4-PHS formed from the 4-PAS. In the present embodiments, non-reacting acids included hydrochloric acid and phosphoric acid. Hydrochloric acid was used in EXAMPLES 1–60 shown in TABLES 1 and 2, and in EXAMPLE 61.

To drive the reaction toward complete conversion of 4-PAS to 4-PHS, it was necessary to maintain an excess of the alcohol present in the reaction medium, or to remove alcohol acetate from the reaction medium as it is formed. Typically, an excess of alcohol was used, wherein the molar equivalents of alcohol to initial 4-ASM ranged from about 5 to about 15. In addition, alcohol acetate was periodically or continuously removed after the concentration of alcohol acetate was such that the solubility of the 4-PAS resulted in a translucent polymer/reaction medium mixture. The alcohol acetate was removed as an azeotrope with alcohol and other reaction medium co-solvents (if present), and typically the combined amount by weight of the alcohol (or alcohol/co-organic solvent)/alcohol acetate removed was replaced with an equivalent amount by weight of the alcohol.

The transesterification reaction was carried out at the reflux temperature of the reaction mixture at atmospheric pressure (about 66° C. for a methanol reaction medium or about 78° C. for an ethanol reaction medium). The time period for reaction was that sufficient to provide at least 85% conversion of 4-PAS to 4-PHS. Conversion was measured by Fourier-Transform Infrared Spectroscopy (FTIR), quantitating the acetate carbonyl peak at about $1760 \, cm^{-1}$, on precipitated, washed and dried polymer. Reaction time periods ranged from about 2 hours to about 16 hours depending on the alcohol used for transesterification (predominantly methanol). The required reaction time period can be decreased by increasing the reaction temperature, by increasing the acid catalyst concentration and or by more rapid removal of alcohol acetate as it is formed.

TABLE 1

POLYMERIZATION OF 4-ASM AND 3-METHYL-4-ASM TO LOW OPTICAL DENSITY (ABSORBANCE) 4-PHS AND 3-METHYL-4-PHS

| Example No. | Type of Initiator | Initial Initiator wt % with Respect to 4-ASM or 3-M-4-ASM | Post Additions of Initiator (wt % with Respect to 4-ASM or 3-M-4-ASM | Type of Alcohol Reaction Medium | Wt % Conv. of 4-ASM to 4-PAS or Conv. of * 3-M-4-ASM to 3-M-4-PHS | Molar Absorbtivity 248 | 4-PHS or 3-M-4-PHS Wt. Avg. Molecular Wt (GPC) | Wt % of Residual 4-PAS or S-4-PAS in Polymer (FTIR) | Wt % of Residual 4-HSM or S-4-HSM or Derivative Residues Thereof in Polymer (by GC) |
|---|---|---|---|---|---|---|---|---|---|
| 1 | AIBN | 10 | | EtOH | | 334 | 7,200 | NA | NA |
| 2 | AIBN | 5 | | EtOH | | 231 | 5,400 | NA | NA |
| 3 | AIBN | 1 | | EtOH | | | 13,800 | NA | NA |
| 4 | AIBN | 1.75 | | EtOH | | | 12,400 | NA | NA |
| 5 | AIBN | 2 | | EtOH | | 656 | 11,500 | NA | NA |
| 6 | AIBN | 5 | | EtOH | | 335 | 7,500 | NA | NA |
| 7 | AIBN | 4 | | EtOH | | 419 | 7,500 | NA | NA |
| 8 | tBPE | 5 | | EtOH | | 374 | 14,300 | NA | 0.74 |
| 9 | tBPE | 5.33 | 1 | EtOH | | 161 | 14,300 | 1.79 | 0.15 |
| 10 | tBPE | 6 | 1.2 | EtOH | | 168 | 13,600 | NA | 0.11 |
| 11 | AIBN | 2 | 0.6 | EtOH | | 346 | 10,900 | NA | NA |
| 12 | AIBN | 2 | 0.5,0.2 | EtOH | 95.6 *** | 341 | 12,000 | 12.7 | 0.72 |
| 13 | tBPE | 5 | 1.3,0.5 | EtOH | 99.3 | 151 | 16,000 | <0.5 | 0.10 |
| 14 | AIBN | 2 | 0.7 | MeOH | 94.8 | 203 | 13,500 | >4.0 | 0.35 |
| 15 | AIBN | 2 | 0.1 | EtOH | 89.5 | 457 | 13,700 | >4.0 | 1.83 |
| 16 | AIBN | 2 | 0.1 | MeOH | 83.5 | 364 | 14,500 | >4.0 | 0.92 |
| 17 | ADPN | 2 | 1,1 | MeOH | 91.5 ** | 195 | 12,800 | 14.1 | 0.14 |
| 18 | AIBN | 2 | 1,1,0.5 | EtOH | 97.8 | 163 | 13,400 | 4.6 | 0.06 |
| 19 | AIBN | 4 | 0.4,0.4 | EtOH | 95.6 | 161 | 6,100 | <0.5 | 0.05 |
| 20 | ADPN | 2.5 | 6 additions @ 0.5 | MeOH | 96.2 | 175 | 11,800 | <0.5 | 0.32 |
| 21 | AIBN | 2.5 | 5 additions @ 0.5 | EtOH | 97.8 | 156 | 12,900 | <0.5 | 0.15 |
| 22 | ADPN | 2.5 | 6 additions @ 0.5 | MeOH | 97.3 | 155 | 16,500 | <0.5 | 0.06 |
| 23 | AIBN | 2.5 | 6 additions @ 0.5 | EtOH | 98.4 | 153 | 12,400 | <0.5 | 0.04 |
| 24 | ADPN | 2.5 | 8 additions @ 0.5 | MeOH | 94.8 | 144 | 10,300 | <0.5 | 0.30 |
| 25 | ADPN | 4 (Total) | Cont. over 3 hours | MeOH | 96.1 | 188 | 12,400 | >4.0 | 0.42 |
| 26 | ADPN | 2.5 | 7 additions @ 0.5 | MeOH | 98.5 | 161 | 11,100 | 2.6 | 0.42 |
| 27 | ADPN | 2.5 | 8 additions @ 0.5 | MeOH | 96.7 | 204 | 10,400 | 15.0 | 0.60 |
| 28 * | AIBN | 4 | 3 additions @ 1.0 | EtOH | 97.6 | 163 | 10,600 | <2.0 | 0.14 |

* 3-methyl-4-ASM converted to 3-methyl-4-PHS.
** This weight % conversion appears to be incorrect based on final GC measurements on the dried polymer.
*** This number was determined using 4-PAS isolated from the reaction mixture by precipitation. Other weight % conversions in Table 1 were determined using the entire reaction mixture. Isolate 4-PAS provides an inaccurately high apparent weight % conversion, since the 4-ASM is complete soluble in the alcohol reaction medium.
AIBN = 2,2'-azobis(2-methylpropanenitrile)
ADPN = 2,2'-azobis(2,4-dimethylpentanenitrile)
tBPE = t-butylperoxy-2-ethylhexanoate)
NA = Not Available

TABLE 2
POLYMERIZATION OF 4-ASM AND 3-METHYL-4-ASM TO LOW OPTICAL DENSITY (ABSORBANCE) 4-PHS AND 3-METHYL-4-PHS

| Example No. (4-ASM only) | Type of Initiator | Initial Initiator Wt % with Respect to 4-ASM | Post Additions of Initiator (wt % with Respect to 4-ASM) | Type of Alcohol Reaction Medium | Wt % Conv. of 4-ASM to 4-PHS | Molar Absorbtivity 248 | 4-PHS Wt. Avg. Molecular Wt (GPC) | Wt % of Residual 4-PAS in Polymer (FTIR) | Wt % of Residual 4-HSM or Derivative Residues Thereof in Polymer (by GC) |
|---|---|---|---|---|---|---|---|---|---|
| 29 | ADPN | 2.5 | 1.25, 1.0, 0.75, 0.5 | MeOH | 96.4 | 137 | 11,200 | 1.06 | NA |
| 30 | ADPN | 2.5 | 0.75, 1.0, 1.25, 2.5 | MeOH | 94.2 | 160 | 19,200 | <0.5 | NA |
| 31 | ADPN | 4.0 | 0.5, 0.75, 1.0, 1.25 | MeOH | 98.0 | 171 | 10,900 | 2.44 | NA |
| 32 | ADPN | 2.5 | 4 additions @ 0.5 | MeOH | 95.0 | 147 | 8,900 | <0.5 | 0.23 |
| 33 | ADPN | 2.5 | 0.5, 0.75, 1.0, 1.25 | MeOH | 95.9 | 179 | NA | <0.5 | 0.08 |
| 34 | ADPN | 5.0 | Con. over 6 hours | MeOH | 94.3 | 150 | NA | <0.5 | 0.32 |
| 35 | ADPN | 2.5 | 0.5, 0.75, 1.0, 1.25 | MeOH | 95.8 | 166 | 12,300 | 13.0 | NA |
| 36 | ADPN | 2.5 | 0.5, 0.75, 1.0, 1.25 | MeOH | 96.9 | 172 | 11,300 | 7.2 | 0.56 |
| 37 | ADPN | 4.5 | 4 additions @ 0.5 | MeOH | 95.5 | 156 | 8,600 | <0.5 | NA |
| 38 | ADPN | 4.5 | 4 additions @ 0.5 | MeOH | 92.6 | 211 | 8,400 | <0.5 | 0.24 |
| 39 | ADPN | 2.5 | 0.5, 0.75, 1.0, 1.25 | MeOH | 89.4 | 191 | 12,300 | <0.5 | 0.62 |
| 40 | ADPN | 2.5 | 0.5, 0.75, 1.0, 1.25 | MeOH | 92.5 | 188 | 13,800 | <0.5 | 0.25 |
| 41 | ADPN | 2.5 | 0.5, 0.75, 1.0, 1.25 | MeOH | 98.9 | 325 | 11,500 | 17.0 | 0.61 |
| 42 | ADPN | 2.5 | 0.5, 0.75, 1.0 | MeOH | 91.8 | 171 | 11,200 | 2.7 | 0.58 |
| 43 | ADPN | 4.5 | 4 additions @ 0.5 | MeOH | 97.1 | 182 | 7,700 | 4.8 | 0.17 |
| 44 | ADPN | 2.5 | 0.5, 0.75, 1.0, 1.25 | MeOH | 94.4 | 206 | 11,100 | <0.5 | 0.26 |
| 45 | ADPN | 4.5 | 4 additions @ 0.5 | MeOH | 88.4 | 189 | 7,800 | <0.5 | 0.68 |
| 46 | ADPN | 2.5 | 0.5, 0.75, 1.0, 1.25 | MeOH | 99.4 | 305 | 10,100 | >4.0 | 2.04 |
| 47 | ADPN | 2.5 | 0.5, 0.75, 1.0, 1.25 | MeOH | 98.2 | 159 | 10,200 | 1.6 | 1.8 |
| 48 | ADPN | 2.5 | 0.5, 0.75, 1.0, 1.25 | MeOH | NA | 173 | 11,500 | <0.5 | NA |
| 49 | ADPN | 2.5 | 0.5, 0.75, 1.0, 1.25 | MeOH | 99.9 | 171 | 10,800 | <0.5 | 0.37 |
| 50 | ADPN | 2.5 | 0.5, 0.75, 1.0, 1.25 | MeOH | 92.5 | 163 | 10,100 | <0.5 | NA |
| 51 | ADPN | 2.5 | 0.5, 0.75, 1.0, 1.25 | MeOH | 95.3 | 160 | 10,400 | 3.3 | NA |
| 52 | ADPN | 2.5 | 0.5, 0.75, 1.0, 1.25 | MeOH | 94.0 | 149 | 10,500 | <0.5 | NA |
| 53 | t-BPP | 2.5 | 6 additions @ 0.5 | MeOH | 94.7 | 184 | 20,830 | <0.5 | 0.16 |
| 54 | t-BPP | 4.0 | 3 additions @ 0.5 | MeOH | 94.5 | 155 | 14,700 | <0.5 | NA |
| 55 | LP | 4.0 | 4 additions @ 0.5 | MeOH | NA | 244 | 31,200 | <0.5 | NA |
| 56 | LP | 4.0 | 4 additions @ 0.5 | MeOH | NA | 142 | 36,100 | <0.5 | NA |
| 57 # | ADPN | 2.5 | 0.5, 0.75, 1.0, 1.25 | MeOH | 99.5 # | 133 | 11,200 | <0.5 | NA |
| 58 | ADPN | 2.5 | 2 @ 1.0, 1 @ 0.5 | @75% THF @25% MeOH | 92.5 | 239 | 9,000 | <1.4 | 0.3 |
| 59 | ADPN | 2.5 | 2 @ 1.0 | @25% THF @80% MeOH | 93.5 | 145 | 10,100 | <2.0 | 0.41 |
| 60 | ADPN | 2.5 | 3 additions @ 0.5 | @45% Acetone @55% MeOH | 94.1 | 158 | 11,600 | <1.4 | 0.27 |

\# Alcohol reaction medium decanted after conversion of 4-ASM to 4-PAS and replaced with clean alcohol prior to transesterification.
@ % by weight of the Reaction Medium
t-BPP = t-butylperoxipivalate
LP = lauroyl perioxide
NA = Not Available
THF = tetrahydrofuran To further illustrate the method of the present invention in a manner which assists one skilled in the art in reproducing the EXAMPLES contained in TABLES 1 and 2, EXAMPLES 24 and 28 are described below below in more specific detail.

EXAMPLE 24

To a 500 ml glass round-bottom flask reactor fitted with a chilled water reflux condenser, a thermowell with thermocouple, a nitrogen purge fitting, an overhead stirrer, and an external heating mantle, a reaction mixture of 80 grams of 4-acetoxystyrene (4-ASM), 120 grams of methanol and 2.0 grams of 2,2'-azobis(2,4-dimethylpentanenitrile) initiator was added. The reaction mixture was stirred for 5 minutes under nitrogen purge to remove oxygen gas present in the reactor. The reaction mixture was then raised to about 66° C., the reflux temperature of methanol. After one hour of polymerization, 0.4 grams of 2,2'-azobis(2,4-dimethylpentanenitrile) dissolved in about 10 grams of methanol was added. At each hour, for the next 7 hours, 0.4 grams of 2,2'-azobis(2,4-dimethylpentanenitrile) in 10 grams of methanol was added. After each addition, a sample of the polymer mixture was withdrawn from the reactor. Analysis of the final polymer mixture sample by capillary gas chromatography showed 94.8% by weight conversion of the 4-acetoxystyrene to poly(4-acetoxystyrene). The transesterification reaction was begun without cooling the reaction mixture; 0.2 grams of 37% hydrochloric acid in water was combined with about 10 grams of methanol and the combination was added to the reaction mixture. The reaction mixture was permitted to react until the color of the mixture turned from white to clear, at which time 150 grams methyl acetate/methanol was removed as a distillate and 150 grams of fresh methanol was added. The transesterification was allowed to proceed for about 4.5 hours, at which time the clear reaction mixture was cooled, precipitated in deionized water, the precipitant was isolated by filtration, the acid was washed from the precipitant (essentially poly(4-hydroxystyrene) with deionized water, and the poly(4-hydroxystyrene) was dried in a vacuum oven at about 70° C. until less than 2 wt % water remained in the poly(4-hydroxystyrene). An FTIR analysis of the poly(4-hydroxystyrene) showed less than 0.5 wt % 4-acetoxystyrene groups remained in the poly(4-hydroxystyrene) as determined by quantitating the absorbance of the carbonyl peak at about 1760 cm$^{-1}$, the acetoxy carbonyl absorbance. A UV-VIS scan showed a molar absorbtivity of 144 l cm$^{-1}$ mole$^{-1}$ at 248 nm. The product was visually very white.

EXAMPLE 28

To a 2000 ml glass round-bottom flask reactor fitted with a chilled water reflux condenser, a thermowell with thermocouple, a nitrogen purge fitting, an overhead stirrer, and an external heating mantel, a reaction mixture of 200 grams of 3-methyl-4-acetoxystyrene (3-M-4-ASM), 800 grams of absolute ethanol, and 8.0 grams of 2,2'-azobis(2-methylpropanenitrile) initiator was added. The reaction mixture was stirred for five minutes under nitrogen purge to remove oxygen gas present in the reactor. The reaction mixture was then raised to about 78° C., the reflux temperature of ethanol. After two hours of polymerization, 2.0 grams of 2,2'-azobis(2-methylpropanenitrile) dissolved in about 20 grams of ethanol was added to the reaction mixture. Every two hours, for the next four hours, 2.0 grams of 2,2'-azobis(2-methylpropanenitrile) in about 20 grams of ethanol was added. Analysis of the final polymer mixture sample, two hours after the last initiator addition, by capillary gas chromatography showed 97.6% by weight conversion of the 3-methyl-4-acetoxystyrene, to poly(3-methyl-4-acetoxystyrene).

The transesterification reaction was begun without cooling the reaction mixture; 1.0 gram of 37% hydrochloric acid in water was combined with about 20 grams of ethanol and the combination was added to the reaction mixture. The reaction mixture was permitted to react until the color of the mixture turned from white to clear, at which time about 250 grams of ethyl acetate/ethanol was removed as a distillate and about 250 grams of fresh ethanol was added. The transesterification was allowed to proceed for 7 hours at which time the clear reaction mixture was cooled, precipitated in deionized water, the precipitant was isolated by filtration, the acid was washed from the precipitant (essentially poly(3-methyl-4-hydroxystyrene) with deionized water, and the poly(3-methyl-4-hydroxystyrene) was dried in a vacuum oven at about 70° C. until less than 2 wt % water remained in the poly(3-methyl-4-hydroxystyrene). An FTIR analysis of the poly(3-methyl-4-hydroxystyrene) showed less than 2.0 wt % (3-methyl-4-acetoxystyrene) groups remaining in the poly(3-methyl-4-hydroxystyrene) as determined by quantitating the absorbance at about 1760 cm$^{-1}$, the acetoxy carbonyl absorbance. A UV-VIS scan showed a molar absorbtivity of 163 l cm$^{-1}$ mole$^{-1}$ at 248 nm. The product was visually white.

The method of the present invention wherein copolymers comprising PHS were produced is described in EXAMPLE 61 which follows.

EXAMPLE 61 was carried out using the same reaction conditions and using the same reactants as those described for production of homopolymers of 4-PHS except that the comonomer was added to the premix comprising ASM. A specifically detailed description of EXAMPLE 61 follows.

EXAMPLE 61

A copolymer of 4-acetoxystyrene and methyl methacrylate was prepared and transesterified to a poly(4-hydroxystyrene-methyl methacrylate) copolymer using the following method.

To a 500 ml glass round-bottom flask reactor fitted with a chilled water reflux condenser, a thermowell with thermocouple, a nitrogen purge fitting, an overhead stirrer, and an external heating mantel, a reaction mixture of 62.5 grams of 4-acetoxystyrene (4-ASM), 62.5 grams of methylmethacrylate, 125 grams of methanol, and 1.5 grams of 2,2'-azobis(2,4-dimethylpentanenitrile) initiator was added. The reaction mixture was stirred for five minutes under nitrogen purge to remove oxygen gas present in the reactor. The reaction mixture was then raised to about 64° C., the reflux temperature of the mixture. After one hour of polymerization, 0.3 grams of 2,2'-azobis(2,4-dimethylpentanenitrile) dissolved in about 10 grams of methanol was added to the reaction mixture. Two hours after the start of the polymerization, 0.5 grams of 2,2'-azobis(2,4-dimethylpentanenitrile) in about 10 grams of methanol was added to the reaction mixture. Three hours after the start of the polymerization, 0.65 grams of 2,2'-azobis(2,4-dimethylpentanenitrile) was added to the reaction mixture. Four hours after the start of the polymerization, 0.8 grams of 2,2'-azobis(2,4-dimethylpentanenitrile) was added to the reaction mixture. Analysis of the final polymer mixture sample, two hours after the last initiator addition, by capillary gas chromatography showed 98.3% by weight conversion of the 4-acetoxystyrene and methylmethacrylate to poly(4-acetoxystyrene-co-methylmethacrylate). The transesterification reaction was begun without cooling the reaction mixture; 0.3 grams of 37% hydrochloric acid in water was combined with about 10 grams of methanol and the combination was added to the reaction mixture. The reaction mixture was permitted to react until the color of the mixture turned from white to clear, at which time about 150 grams of methyl acetate/methanol was removed as a distillate and about 150 grams of fresh methanol was added. The transesterification was allowed to proceed for 4 hours at which time the clear reaction mixture was cooled, precipitated in deionized water, the precipitant was isolated by filtration, the acid was washed from the precipitant (essentially poly(4-hydroxystyrene-co-methylmethacrylate) with deionized water, and the poly(4-hydroxystyrene-co-methylmethacrylate) (4-PHS/MMA). The 4-PHS/MMA was dried in a vacuum oven at about 70° C. until less than 2 wt % water remained in the 4-PHS/MMA. An FTIR analysis of the 4-PHS/MMA showed less than 2.0 wt % (4-acetoxystyrene) groups remaining in the 4-PHS/MMA. The weight average molecular weight of the 4-PHS/MMA was about 22,000 by GPC. A UV-VIS scan showed a molar absorbtivity of 48 l cm$^{-1}$ mole$^{-1}$ at 248 nm. The product was visually white.

EXAMPLE 62

Comparative Example

The purpose of this Example is to demonstrate that the simultaneous polymerization and hydrolysis method of producing poly(4-hydroxystyrene) described by Elmore, European Patent Application No. 87307912.3, even if carried out using an acid catalyzed methanolysis as disclosed by Gupta, U.S. Pat. No. 4,898,916, provides a reaction product which does not have the low optical density (absorbance over a 240-260 nm wavelength) characteristics of the product produced by the method of the present invention.

A 500 ml glass round-bottom flask reactor fitted with a chilled water reflux condenser, a thermowell with thermocouple, a nitrogen purge fitting, an overhead stirrer, and an external heating mantle, was charged with 100 gm of methanol (MeOH) and 2.7 gm of 37% HCl (0.5% by weight HCl based on the MeOH and the 4-ASM to be added subsequently). Separately 100 gm of 4-acetoxystyrene (4-ASM), 2,2'-azobis(2-methylpropanenitrile) were mixed and kept cold in an ice bath. The methanol/HCl mixture was stirred for about 5 minutes under a nitrogen purge to remove gases other than nitrogen from the reactor. The temperature of the methanol/HCl mixture was then raised to about 66° C., the reflux temperature of methanol at atmospheric pressure. The 4-ASM/initiator mixture was periodically added to the flask reactor over a 3 hour period. 110 gm of methylacetate/methanol was removed during the reaction. Upon the initial addition of 4-ASM/initator solution, the temperature of the reactants in the flask reactor dropped to 61.4° C., indicating the production of methyl acetate. As methyl acetate was removed, and fresh methanol added, the temperature climbed to 64.5° C. toward the end of the reaction.

Analysis of the final polymer mixture sample by capillary gas chomatography showed a 99% by weight conversion of the 4-acetoxystyrene.

After completion of the simultaneous polymerization-hydrolysis reaction, the reaction mixture was cooled, and precipitated in deionized water, the precipitate was isolated by filtration, residual acid was washed from the precipitant using deionized water, and the reaction product was dried in a vacuum oven at about 70° C. until less than 2 weight % water remained in the reaction product.

An FTIR analysis of the precipitant portion of the reaction product showed the precipitant to comprise PHS, wherein less than about 1.7 wt % 4-acetoxystyrene groups remained in the PHS. The weight average molecular weight (Mw) of this PHS portion of the reaction product was about 2,000. This reaction method does not permit the isolation of PHS. This reaction method also did not permit control of the Mw of the reaction product. The Mw of the PHS could not be controlled, in part because hydroxystyrene monomer (HSM) was formed and polymerized not only via free radical means, but possibly by cationic means.

The molar absorbtivity, $\epsilon$, of the PHS portion of the reaction product at $UV_{248}$ measured 868 (far greater than the 250 or less desired for the product produced by the method of the present invention). This high $\epsilon$ is apparently due to the formation of quinones or other highly absorbing species due to the simultaneous polymerization and hydrolysis reaction technique.

Pertaining to the method of the present invention, the homopolymers and copolymers comprising 4-PHS (and S-4-PHS) were isolated from the final, transesterification reaction medium by precipitation. The preferred precipitation medium is water although organic solvents, such as heptane, hexane, and cyclohexane, in which the PHS homopolymers and copolymers thereof are sufficiently insoluble can be used.

When water was used as the precipitation medium, the polymer/reaction medium mixture was added to water which water was in motion. Typically, at room temperature, the weight amount of water was in excess of the weight amount of polymer/reaction medium mixture by at least a factor of eight. The preferred alcohol reaction medium is methanol for a water precipitation, since the PHS polymer or copolymer thereof precipitates at a particle size larger than about 50 microns. Use of higher molecular weight alcohol reaction mediums appears to cause the precipitated particle size of the PHS homopolymer (or copolymer thereof) to be smaller than about 50 microns. Larger particle size is easier to filter.

Although the present invention is described in terms of polymers of 4-hydroxystyrene and/or substituted 4-hydroxystyrene, further functionalization of these polymers which provides enhanced performance in particular optical applications is considered to fall within the scope of the present invention. For example, when these polymers are to be used as polymeric components in photoresists, it is known to be desirable to replace the hydroxy group at the 4 position of the compound structure with a t-butoxycarbonyl group. The presence of this t-butoxycarbonyl group on the polymer improves the sensitivity of polymer to imaging radiation striking the photoresist. It is also known to replace the hydroxy group with a t-butoxy group, also for use in photoresist applications. The present invention provides polymeric compounds (and a method for their preparation) which meet the optical (radiation absorption) requirements necessary to function as a deep UV, X-ray, or E-Beam photoresist material. Further functionalization of this basic polymeric material, which does not detrimentally affect the overall performance of the polymer in the intended application, is intended to fall within the scope of the present invention.

While specific reaction conditions, reactants, and equipment are described above to enable one skilled in the art to practice the invention, one skilled in the art will be able to make modifications and adjustments which are obvious extensions of the present inventions. Such obvious extensions of or equivalents to the present invention are intended to be within the scope of the present invention, as demonstrated by the claims which follow.

What is claimed is:

1. A process for preparation of polymers having low optical density at 240-260 nm, comprising poly(4-hydroxystyrene) or substituted poly(4-hydroxystyrene) or both, said process comprising the steps of:

a) reacting a mixture comprising 4-acetoxystyrene monomer or substituted 4-acetoxystyrene monomer or both and an initiator, wherein said initiator and its decomposition products alone or as polymer capping groups do not substantially absorb radiation over wavelengths ranging from about 240 to about 260 nm, or wherein said initiator is present at a concentration of less than about 3 mole % of said monomer, in a reaction medium comprising at least one organic solvent, to produce a polymer comprising poly(4-acetoxystyrene) or substituted poly(4-acetoxystyrene) or both, whereby, either as a result of monomer conversion, or due to removal of residual monomer, 10 wt % or less residual monomer, based on the weight of polymer produced, is present in the reaction mixture used during a subsequent transesterification reaction step; and b) subsequently transesterifying said poly(4-acetoxystyrene) to poly(4-hydroxystyrene) or transesterifying said substituted poly(4-acetoxystyrene) to substituted poly(4-hydroxystyrene) or transesterifying both, in a transesterification reaction medium comprising at least one equivalent of alcohol per equivalent of non-transesterified poly(4-acetoxystyrene) or substituted poly(4-acetoxystyrene), using approximately 5–2000 ppm of an acid catalyst to achieve said transesterification, wherein at least 85% by weight conversion of said poly(4-acetoxystyrene) to said poly(4-hydroxystyrene) or conversion of said substituted poly(4-acetoxystyrene) to said substituted poly(4-hydroxystyrene) or at least 85% by weight transesterification of both is obtained.

2. The process of claim 1, wherein a $C_1$–$C_5$ alcohol comprises at least the majority of said reaction medium of step a).

3. The process of claim 2, wherein said transesterification reaction medium of step b) is essentially the same reaction medium as that used in step a) or is a functional equivalent thereof.

4. The process of claim 1, claim 2, or claim 3, including an additional step:
  c) isolation of said polymer comprising poly(4-hydroxystyrene), or said polymer comprising substituted poly(4-hydroxystyrene), or a polymer comprising both from said transesterification reaction medium.

5. The process of claim 1, claim 2, or claim 3, wherein said reacting mixture comprises substituted 4-acetoxystyrene monomer, and wherein the substitution is on the ring structure of said 4-acetoxystyrene at the 3, or 5, or 3 and 5 positions.

6. The process of claim 5, wherein said substituent group is methyl or ethyl.

7. The process of claim 1, claim 2, or claim 3, wherein said initator is selected from the group consisting of 2,2'-azobis(2,4-dimethylpentanenitrile), 2,2'-azobis(2-methylpropanenitrile, 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, diisononanoyl peroxide, decanoyl peroxide, succinic acid peroxide, di(n-propyl) peroxydicarbonate, di(secbutyl) peroxydicarbonate, di(2-ethyl-hexyl) peroxydicarbonate, t-butylperoxyneodecanoate 2,5-dimethyl-2,5-di(2 ethylhexanoylperoxy)hexane, t-amylperoxy-neodecanoate, t-butylperoxy-neodeconate, and combinations thereof.

8. The process of claim 7, wherein said initiator is selected from the group consisting of 2,2'-azobis(2,4-dimethylpentanenitrile), 2,2'-azobis(2-methylpropanenitrile, 2,2'-azobis(2-methylbutanenitrile), 1,1'-azobis(cyclohexanecarbonitrile), t-butyl peroxypivalate, t-amyl peroxypivalate, and combinations thereof.

9. The process of claim 1, claim 2, or claim 3, wherein said initiator is selected from the group consisting of benzoyl peroxide, t-butylperoxybenzoate, and di-t-butyl diperoxyphthalate, and wherein the mole % of said initiator is less than about 3 mole % of said monomer.

10. The process of claim 2 or claim 3, wherein said alcohol reaction medium is selected from alcohols having 1 to 2 carbon atoms and combinations thereof.

11. The process of claim 1, claim 2, or claim 3, wherein said acid catalyst will not substantially react with said poly(4-acetoxystyrene), said substituted poly(4-acetoxystyrene) or with said poly(4-hydroxystyrene) or said substituted poly(4-hydroxystyrene) formed therefrom.

12. The process of claim 11, wherein said acid catalyst is selected from the group consisting of hydrochloric acid, phosphoric acid, nitric acid, sulfuric acid, methane sulfonic acid, and toluene sulfonic acid.

13. The process of claim 1, claim 2, or claim 3, wherein said initiator is added periodically or continuously during step a), whereby at least 90% by weight conversion of said 4-acetoxystyrene monomer or said substituted 4-acetoxystyrene monomer is achieved.

14. The process of claim 1, claim 2, or claim 3, wherein said initiator exhibits a half life ranging from about 0.5 hours to about 10 hours at the temperature at which said reaction is carried out.

15. The process of claim 13, wherein said initiator exhibits a half life ranging from about 0.5 hours to about 10 hours at the temperature at which said reaction is carried out.

16. The process of claim 2 or claim 3, wherein said alcohol reaction medium is selected from alcohols having from 3 to 5 carbon atoms and wherein an additional alcohol is added during step b) and wherein said additional alcohol is selected from alcohols having 1 to 2 carbon atoms or combination thereof.

17. The process of claim 4, wherein said step c) isolation is accomplished by precipitation of said poly(4-hydroxystyrene) or said substituted poly(4-hydroxystyrene) from said reaction medium.

18. The process of claim 17, wherein said precipitation is accomplished by adding the reaction mixture of step b) to water which is in motion.

19. The process of claim 18, wherein the precipitate of said poly(4-hydroxystyrene) or said substituted poly(4-hydroxystyrene) is treated to remove residual acid.

20. The process of claim 1, claim 2, or claim 3, wherein the amount of said poly(4-hydroxystyrene) or said substituted poly(4-hydroxystyrene) or both in said reaction mixture ranges from about 10% to about 30% by weight.

21. A process for preparation of polymers having low optical density at 240–260 nm, comprising poly(4-hydroxystyrene) or substituted poly(4-hydroxystyrene) or both, said process comprising the steps of:
  a) reacting a mixture comprising 4-acetoxystyrene monomer or substituted 4-acetoxystyrene monomer or both and a comonomer having at least one vinyl group present, wherein said comonomer does not substantially absorb radiation over wavelengths ranging from about 240 to about 260 nm; and an initiator, wherein said initiator and its decomposition products alone or as capping groups do not substantially absorb radiation over wavelengths ranging from about 240 to about 260 nm, or wherein said initiator is present at a concentration of less than about 3 mole % of said monomer; in a reaction medium comprising at least one organic solvent, to produce a copolymer of poly(4-acetoxystyrene) or said substituted poly(4-acetoxystyrene) with said comonomer, whereby, either as a result of monomer conversion or due to removal of residual monomer, 10 wt % or less residual monomer, based on the weight of polymer produced, is present in the reaction mixture during a subsequent, transesterification reaction step; and
  b) subsequently transesterifying said poly(4-acetoxystyrene) to poly(4-hydroxystyrene) or transesterifying said substituted poly(4-hydroxystyrene) to to substituted poly(4-hydroxystyrene) or transesterifying both to a conversion of at least 85% by weight, in a transesterification reaction medium comprising at least one equivalent of alcohol per equivalent of non-transesterified copolymer, using approximately 5-2000 ppm of an acid catalyst to achieve said transesterification.

22. The process of claim 21, including an additional step:
c) isolation of said polymer comprising poly(4-hydroxystyrene) or said substituted poly(4-hydroxystyrene) or both from said reaction medium.

23. The process of claim 21 or claim 22, wherein said reacting mixture comprises substituted 4-acetoxystyrene monomer, and wherein the substitution is on the ring structure of said 4-acetoxystyrene at the 3, 5, or 3 and 5 positions.

24. The process of claim 23, wherein said substituent group is methyl or ethyl.

25. The process of claim 21 or claim 22, wherein said initiator is selected from the group consisting of 2,2'-azobis(2,4-dimethylpentanenitrile), 2,2'-azobis(2-methylpropanenitrile, 2,2'-azobis(2-methylbutanenitrile, 1,1'-azobis(cyclohexanecarbonitrile), t-butyl peroxy-2-ethylhexanoate, t-butyl peroxypivalate, t-amyl peroxypivalate, diisononanoyl peroxide, decanoyl peroxide, succinic acid peroxide, di(n-propyl) peroxydicarbonate, di(secbutyl) peroxydicarbonate, di(2-ethyl-hexyl) peroxydicarbonate, t-butylperoxyneodecanoate 2,5-dimethyl-2,5-di(2 ethylhexanoylperoxy)hexane, t-amyl-peroxy-neodecanoate, t-butylperoxy-neodeconate, and combinations thereof.

26. The process of claim 25, wherein said initiator is selected from the group consisting of 2,2'-azobis(2,4-dimethylpentanenitrile), 2,2'-azobis(2-methylpropanenitrile, 2,2'-azobis(2-methylbutanenitrile), 1,1'-zaobis(cyclohexanecarbonitrile), t-butyl peroxypivalate, t-amyl peroxypivalate, and combinations thereof.

27. The process of claim 21 or claim 22, wherein said initiator is selected from the group comprising benzoylperoxide, t-butylperoxybenzoate, and di-t-butyl diperoxyphthalate, and wherein the mole % of said initiator is less than about 3 mole % of said monomer.

28. The process of claim 21 or claim 22, wherein said reaction medium of step a) is an alcohol reaction medium selected from alcohols having 1 to 5 carbon atoms and combinations thereof.

29. The process of claim 28, wherein said transesterification reaction medium of step b) is essentially the same reaction medium as that used in step a) or is a functional equivalent thereof.

30. The process of claim 29, wherein said alcohol reaction medium is selected from methanol and ethanol and combinations thereof.

31. The process of claim 21 or claim 22, wherein said acid catalyst will not substantially react with said poly(4-acetoxystyrene) or said substituted poly(4-acetoxystyrene), the polymer of said comonomer, said poly(4-hydroxystyrene) or said substituted poly(4-hydroxystyrene) or any transesterified form of said comonomer.

32. The process of claim 21 or claim 22, wherein said initiator is added periodically or continuously during step a), whereby at least 90% by weight conversion is obtained for the combination of said 4-acetoxystyrene monomer or said substituted 4-acetoxystyrene monomer and said comonomer.

33. The process of claim 28, wherein said alcohol reaction medium is selected from alcohols having from 3 to 5 carbon atoms, wherein an additional alcohol is added during step b) and wherein said additional alcohol is selected from alcohols having 1 to 2 carbon atoms or combinations thereof.

34. The process of claim 22, wherein said step c) isolation is accomplished by precipitation of said polymer comprising poly(4-hydroxystyrene) or substituted poly(4-hydroxystyrene) or both from said reaction medium.

35. The process of claim 34, wherein the precipitate of said polymer is treated to remove residual acid.

36. The process of claim 1, claim 2, or claim 3, wherein said 4-acetoxystyrene monomer or said substituted 4-acetoxystyrene monomer or both of step a) contains no inhibitor which substantially absorbs radiation over wavelengths ranging from about 240 to about 260 nm.

37. The process of claim 21 or claim 22, wherein said 4-acetoxystyrene monomer or said substituted 4-acetoxystyrene monomer or both and said comonomer of step a) contain no inhibitor which substantially absorbs radiation over wavelengths ranging from about 240 to about 260 nm.

38. A process for preparation of low optical density copolymers of poly(4-hydroxystyrene) with substituted poly(4-hydroxystyrene), said process comprising the steps of:
a) reacting a mixture comprising 4-acetoxystyrene monomer, substituted 4-acetoxystyrene monomer and an initiator, wherein said initiator and its decomposition products alone or as polymer capping groups do not substantially absorb radiation over wavelengths ranging from about 240 to about 260 nm, or wherein said initiator is present at a concentration of less than about 3 mole % of said monomer, in a reaction medium comprising at least one alcohol to produce a copolymer of poly(4-acetoxystyrene) with substituted poly(4-acetoxystyrene), wherein at least 90% by weight conversion of said 4-acetoxystyrene monomer and said substituted 4-acetoxystyrene monomer combined is obtained; and
b) subsequently transesterifying said poly(4-acetoxystyrene) and said substituted poly(4-acetoxystyrene) to poly(4-hydroxystyrene) and substituted poly(4-hydroxystyrene), in substantially said reaction medium of step a), using approximately 5-2000 ppm of an acid catalyst to achieve said transesterification, wherein at least 85% by weight conversion of the combination of said poly(4-acetoxystyrene) to said poly(4-hydroxystyrene) and said substituted poly(4-acetoxystyrene) to said substituted poly(4-hydroxystyrene) is obtained.

39. The process of claim 38, including an additional step:
c) isolation of said copolymer from said reaction medium.

40. The process of claim 38 or claim 39, wherein said substituted 4-acetoxystyrene monomer is substituted on the ring structure at the 3, or 5, or 3 and 5 positions.

41. The process of claim 40, wherein said substituent group is methyl or ethyl.

42. The process of claim 38 or claim 39, wherein said initiator is selected from the group consisting of 2,2'-azobis(2,4-dimethylpentanenitrile), 2,2'-azobis(2-methylpropanenitrile, 2,2'-azobis(2-methylbutanenitrile, 1,1'-azobis(cyclohexanecarbonitrile), t-butyl peroxy-2-ethylhexanoate, t-butyl peroxypivalate, t-amyl peroxypivalate, diisononanoyl peroxide, decanoyl peroxide, succinic acid peroxide, di(n-propyl) peroxydicarbonate, di(sec-butyl) peroxydicarbonate, di(2-ethyl-hexyl) peroxydicarbonate, t-butylperoxyneodecanoate 2,5-dimethyl-2,5-di(2 ethylhexanoylperoxy)hexane, t-amyl-peroxy-neodecanoate, t-butylperoxy-neodeconate, and combinations thereof.

43. The process of claim 42, wherein said initiator is selected from the group consisting of 2,2'-azobis(2,4-dimethylpentanenitrile), 2,2'-azobis(2-methylpropanenitrile, 2,2'-azobis(2-methylbutanenitrile), 1,1'-azobis(cyclohexanecarbonitrile), t-butyl peroxypivalate, t-amyl peroxypivalate, and combinations thereof.

44. The process of claim 38 or claim 39, wherein said initiator is selected from the group consisting of benzoylperoxide, t-butyl-peroxybenzoate, and di-t-butyl diperoxyphthalate, and wherein the mole % of said initiator is less than about 3 mole % of said monomer.

45. The process of claim 38 or claim 39, wherein said alcohol reaction medium is selected from alcohols having 1 to 5 carbon atoms and combinations thereof.

46. The process of claim 38 or claim 39, wherein said initiator is added periodically or continuously during step a) whereby at least 90% by weight conversion is obtained of said 4-acetoxystyrene monomer and said substituted 4-acetoxystyrene monomer combined.

47. The process of claim 39, wherein said step c) isolation is accomplished by the precipitation of said copolymer from said reaction medium.

48. The process of claim 47, wherein the precipitate of said copolymer is treated to remove residual acid.

49. The process of claim 38, wherein said 4-acetoxystyrene monomer and said substituted 4-acetoxystyren monomer of step a) contain no inhibitor which substantially absorbs radiaiton over wavelengths ranging from about 240 to 260 nm.

50. The process of claim 1, claim 21, or claim 38, wherein said step a) conversion of monomer to polymer is less than 90% by weight, but wherein said reaction medium of step a) is substantially decanted from said polymer and replaced with fresh, clean alcohol reaction medium prior to said step b) transesterification.

51. The process of claim 50, wherein $C_1$–$C_5$ alcohol comprises at least the majority of said reaction on medium of step a) and wherein said replacement alcohol reaction medium is essentially the alcohol reaction medium as that used in step a) or a functional equivalent thereof.

52. The process of claim 50, wherein said replacement alcohol reaction medium is a substantially different kind of alcohol reaction medium from that used in step a).

53. The process of claim 50, wherein said replacement alcohol reaction medium comprises at least one alcohol selected from alcohols having from 1 to 5 carbon atoms.

* * * * *